(12) United States Patent  
Chang

(10) Patent No.: US 8,057,087 B2  
(45) Date of Patent: Nov. 15, 2011

(54) LIGHT SOURCE MODULE WITH LIGHT EMITTING DIODES

(75) Inventor: Jen-Tsorng Chang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 243 days.

(21) Appl. No.: 12/607,173

(22) Filed: Oct. 28, 2009

(65) Prior Publication Data

US 2010/0149802 A1    Jun. 17, 2010

(30) Foreign Application Priority Data

Dec. 15, 2008 (CN) .................. 2008 1 0306255.5

(51) Int. Cl.  
*F21V 7/04* (2006.01)
(52) U.S. Cl. .................. 362/621; 362/249.04; 362/613; 362/615; 362/628; 362/612
(58) Field of Classification Search ............... 362/97.3, 362/227, 249.01–249.02, 249.04, 511, 555, 362/600, 606, 612–613, 615, 621, 628, 800  
See application file for complete search history.

(56) References Cited

U.S. PATENT DOCUMENTS

| | | | | |
|---|---|---|---|---|
| 6,979,112 B2 * | 12/2005 | Yu et al. | | 362/600 |
| 7,637,646 B2 * | 12/2009 | Byun et al. | | 362/608 |
| 7,789,549 B2 * | 9/2010 | Tanabe | | 362/621 |
| 2005/0013127 A1 * | 1/2005 | Tsai | | 362/31 |
| 2010/0135043 A1 * | 6/2010 | Wang et al. | | 362/628 |

* cited by examiner

*Primary Examiner* — Stephen F Husar  
*Assistant Examiner* — Meghan Dunwiddie  
(74) *Attorney, Agent, or Firm* — Altis Law Group, Inc.

(57) ABSTRACT

An exemplary light source module includes a flexible printed circuit board (FPCB), a number of light emitting diodes (LEDs), and a light guide plate (LGP). The LEDs are mounted on the PCB, which is capable of switching each of the LEDs on and off. The LGP includes a light input surface and a number of light output surfaces. The light input surface is opposite to the LEDs. The LEDs face the light input surfaces, and at least one light guide structure is defined at the light input surface so that a majority of light beams from each LED pass substantially perpendicularly through a corresponding portion of the at least one light guide structure and exit from a corresponding light output surface.

20 Claims, 7 Drawing Sheets

LIGHT SOURCE MODULE WITH LIGHT EMITTING DIODES

BACKGROUND

1. Technical Field

The present invention generally relates to light source modules and, particularly, to a light source module having light emitting diodes (LEDs).

2. Description of Related Art

Liquid crystal display devices have many desirable performance characteristics, such as large-scale information display capability, easy coloring, low power consumption, long life, little or no associated pollution, and so on. Therefore, liquid crystal display devices are widely used in numerous kinds of electronic devices. A typical liquid crystal display device generally includes a light source module and a liquid crystal screen. The light source module typically includes a light guide plate (LGP), and at least one linear light source or point light source such as a cold cathode ray tube or an LED. The light guide plate has a rectangular cross section, and includes a bottom face, a top face, and four side faces. Light from the cold cathode ray tube or the LED is projected to enter one of the side faces of the LGP, whereupon the light is internally reflected by other side faces and the bottom face, and then emits from the top face to illuminate the liquid crystal screen positioned on the top face. However, with the ongoing development of electronic devices and demand for high quality liquid crystal display devices, the above-described illuminating means may not yield satisfactory performance.

What is needed, therefore, is a light source module which can overcome the above-described problem.

BRIEF DESCRIPTION OF THE DRAWINGS

Many aspects of the present light source module can be better understood with reference to the following drawings. The components in the drawings are not necessarily drawn to scale, the emphasis instead being placed upon clearly illustrating the principles of the present light source module. Moreover, in the drawings, like reference numerals designate corresponding parts throughout the several views, and all the views are schematic.

DETAILED DESCRIPTION

Various embodiments will now be described in detail below and with reference to the drawings.

Figure 1:
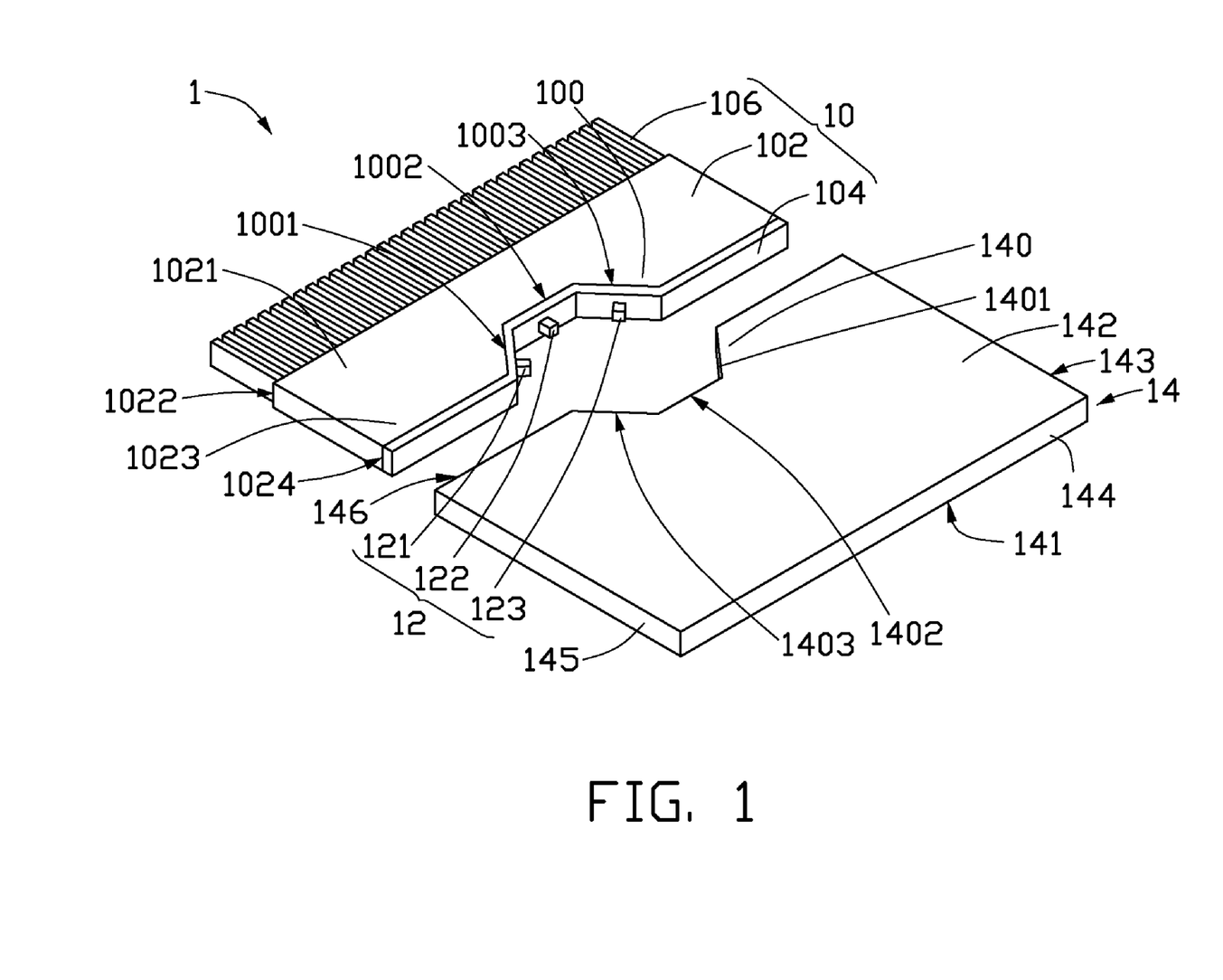
FIG. 1 is an isometric view of a first embodiment of a light source module, the light source module including a flexible printed circuit board.

FIG. 1 is an isometric view of a first embodiment of a light source module 1. The light source module 1 includes a base assembly 10, a plurality of LEDs 12, and an LGP 14.

The base assembly 10 includes a heat dissipation plate 102, a flexible printed circuit board (FPCB) 104, and a plurality of heat dissipation fins 106. The heat dissipation plate 102 can be made of material with high heat conductivity, such as copper, aluminum, or alloys thereof. The heat dissipation plate 102 can be solid, or can be hollow and filled with heat dissipation medium (such as supercritical fluid). The heat dissipation plate 102 has a first side 1021 and a second side 1023 at opposite long sides thereof. The first side 1021 defines a first side surface 1022. The heat dissipation fins 106 are fixed on the first side surface 1022. In an alternative embodiment, the heat dissipation fins 106 and the heat dissipation plate 102 are formed as a single integrated body of material without seams. In the illustrated embodiment, the heat dissipation fins 106 are elongate, with each dissipation fin 106 extending perpendicularly from the first side surface 1022. Each heat dissipation fin 106 is oriented vertically, with the heat dissipation fins 106 being parallel to each other and evenly spaced from each other along a length of the first side surface 1022. A height of each heat dissipation fin 106 is the same as or slightly less than a thickness of the heat dissipation plate 102.

The second side 1023 defines a second side surface 1024 parallel to the first side surface 1022. In the illustrated embodiment, the second side surface 1024 is bifurcated, with a light source orienting structure 100 being provided at a central region of the second side 1023 between the two sections of the second side surface 1024. The light source orienting structure 100 can be in the form of a recessed portion or a protrusion. In the illustrated embodiment, the light source orienting structure 100 is a recessed portion of the second side 1023. The recessed portion defines a trapezoidal-shaped recess. Thus, the recessed portion of the heat dissipation plate 102 has a first mounting surface 1001, a second mounting surface 1002, and a third mounting surface 1003. The first and third mounting surfaces 1001, 1003 are inclined surfaces, each of which is oriented at an angle of about 120° to the second side surface 1024. The second mounting surface 1002 interconnects the first and third mounting surfaces 1001, 1003, and is parallel to the second side surface 1024. In other embodiments, there can be more than one light source orienting structure 100.

Figure 2:
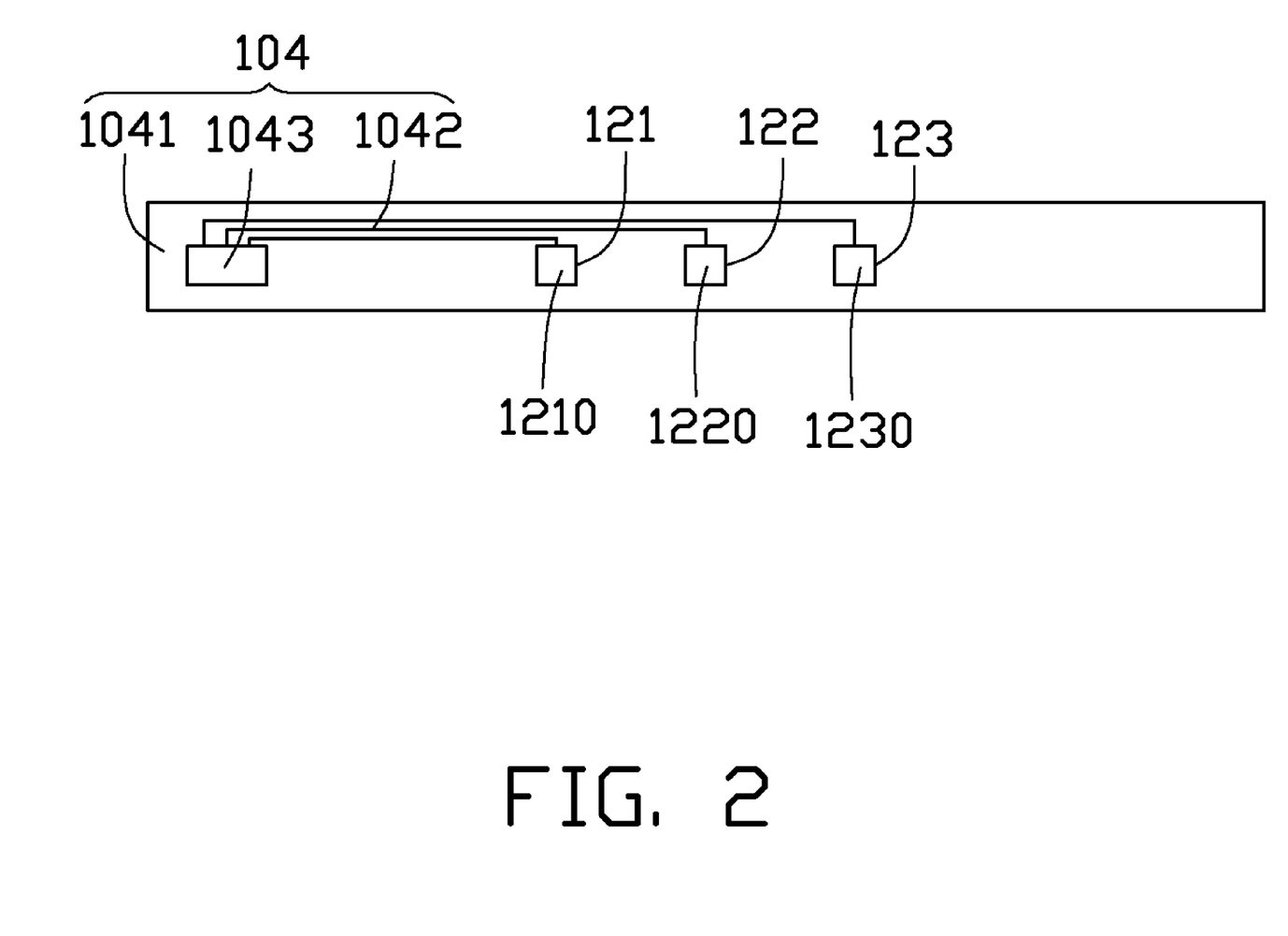
FIG. 2 is a front plan view of the flexible printed circuit board of the light source module of FIG. 1.

The FPCB 104 can be bent into any of various desired shapes. Thus the FPCB 104 can be snugly attached to the second side 1023 of the heat dissipation plate 102. That is, the FPCB 104 is in tight contact with the second side surface 1024 and the mounting surfaces 1001, 1002, 1003. Referring also to FIG. 2, the FPCB 104 includes a substrate layer 1041, a plurality of electrically connecting circuits 1042, and a driving chip 1043. The substrate layer 1041 can be an insulating layer of polyimide, poly(ethylene terephthalate), or other flexible material. Each of the electrically connecting circuits 1042 electrically connects to the driving chip 1043. The driving chip 1043 is capable of controlling (switching) the connectivity of each of the electrically connecting circuits 1042. That is, the driving chip 1043 can connect or disconnect each electrically connecting circuit 1042 to or from its corresponding LED 12.

It is noted that the electrically connecting circuits 1042 and the driving chip 1043 are not shown in FIG. 1. It is also understood that the FPCB 104 typically includes other circuits and contacts not shown in FIGS. 1 and 2.

The LEDs 12 are mounted on the substrate layer 1041 of the FPCB 104, and are individually electrically connected with the electrically connecting circuits 1042. That is, one end of each electrically connecting circuit 1042 is connected with one LED 12, and the other end of each electrically connecting circuit 1042 is connected with the driving chip 1043. Thus, each of the LEDs 12 can be controlled (switched on or off) by the driving chip 1043.

Each LED 12 is rectangular-shaped, and has a light emitting surface substantially parallel to the substrate layer 1041. In the illustrated embodiment, the light source module 1 includes a first LED 121 with a first light emitting surface 1210, a second LED 122 with a second light emitting surface 1220, and a third LED 123 with a third light emitting surface 1230. The LEDs 121, 122, 123 are attached on the FPCB 104, being arranged in sequence along a length of a center portion of the substrate layer 1041. Specifically, the FPCB 104 is fixed on the second side 1023 of the heat dissipation plate 102 in such a manner that the first LED 121 is positioned substantially at the first mounting surface 1001, the second LED 122 is positioned substantially at the second mounting surface 1002, and the third LED 123 is positioned substantially at the third mounting surface 1003. In addition, the first light emitting surface 1210 of the first LED 121 is parallel to the first mounting surface 1001, the second light emitting surface 1220 of the second LED 122 is parallel to the second mounting surface 1002, and the third light emitting surface 1230 of the third LED 123 is parallel to the third mounting surface 1003.

Preferably, the LEDs 121, 122, 123 are capable of emitting light in different ranges of the visible spectrum. For instance, the first LED 121 emits red light, the second LED 122 emits green light, and the third LED 123 emits blue light.

The LGP 14 is generally rectangular, and includes a bottom face 141 and a top face 142 at opposite sides thereof, and four side faces 143-146 interconnecting the bottom face 141 and the top face 142. In particular, the LGP 14 includes a first side face 143, a second side face 144, a third side face 145, and a fourth side face 146. The fourth side face 146 is generally opposite and adjacent to the second side 1023 of the heat dissipation plate 102, and serves as a light input surface. The first, second, and third side faces 143, 144, 145 serve as light output surfaces, and have a plurality of dotted microstructures (not shown) defined thereon to improve the uniformity of light emitted therefrom. In this description, a "microstructure" is defined as a structure having at least one of three dimensions thereof in the range from about 0.1 micrometers to about 100 micrometers.

In the illustrated embodiment, the fourth side face 146 is bifurcated, with a light guide structure 140 being provided at a central region of that side of the LGP 14 between the two sections of the fourth side face 146. The light guide structure 140 can be in the form of a recessed portion or a protrusion, and corresponds to the light source orienting structure 100. In the illustrated embodiment, the light guide structure 140 is a recessed portion of the side of the LGP 14. The recessed portion defines a trapezoidal-shaped recess. Thus, the recessed portion of the side of the LGP 14 has a first light incident surface 1401, a second light incident surface 1402, and a third light incident surface 1403. The first and third light incident surfaces 1401, 1403 are inclined at an angle of about 120° to the second light incident surface 1402. The second light incident surface 1402 interconnects the first and third light incident surfaces 1401, 1403, and is parallel to the fourth side face 146. In detail, the first light incident surface 1401 is substantially parallel to the first mounting surface 1001, facing the first LED 121, and corresponds to the first side face 143. The second light incident surface 1402 is substantially parallel to the second mounting surface 1002, facing the second LED 122, and corresponds to the second side face 144. The third light incident surface 1403 is substantially parallel to the third mounting surface 1003, facing the third LED 123, and corresponds to the third side face 145.

Therefore, many or even most light beams from the first LED 121 can propagate substantially perpendicularly into the first light incident surface 1401, and exit from the first side face 143. Many or even most light beams from the second LED 122 can propagate substantially perpendicularly into the second light incident surface 1402, and exit from the second side face 144. Many or even most light beams from the third LED 123 can propagate substantially perpendicularly into the third light incident surface 1403, and exit from the third side face 145.

When the light source module 1 operates, in one example, the driving chip 1043 switches the first, second, and third LEDs 121, 122, 123 on at the same time. Thus the first, second, and third side faces 143, 144, 145 are simultaneously illuminated with red, green, and blue light, respectively. In another example, the driving chip 1043 switches the first, second, and third LEDs 121, 122, 123 on in sequence. Thus, the first, second, and third side faces 143, 144, 145 are sequentially illuminated with red, green, and blue light, respectively. In other words, the light source module 1 can provide various illumination effects according to the mode of switching applied by the driving chip 1043. In addition, heat generated by the LEDs 12 can be dissipated via the heat dissipation plate 102 and the heat dissipation fins 106. Thus, the light source module 1 can provide enhanced longevity.

Figure 3:
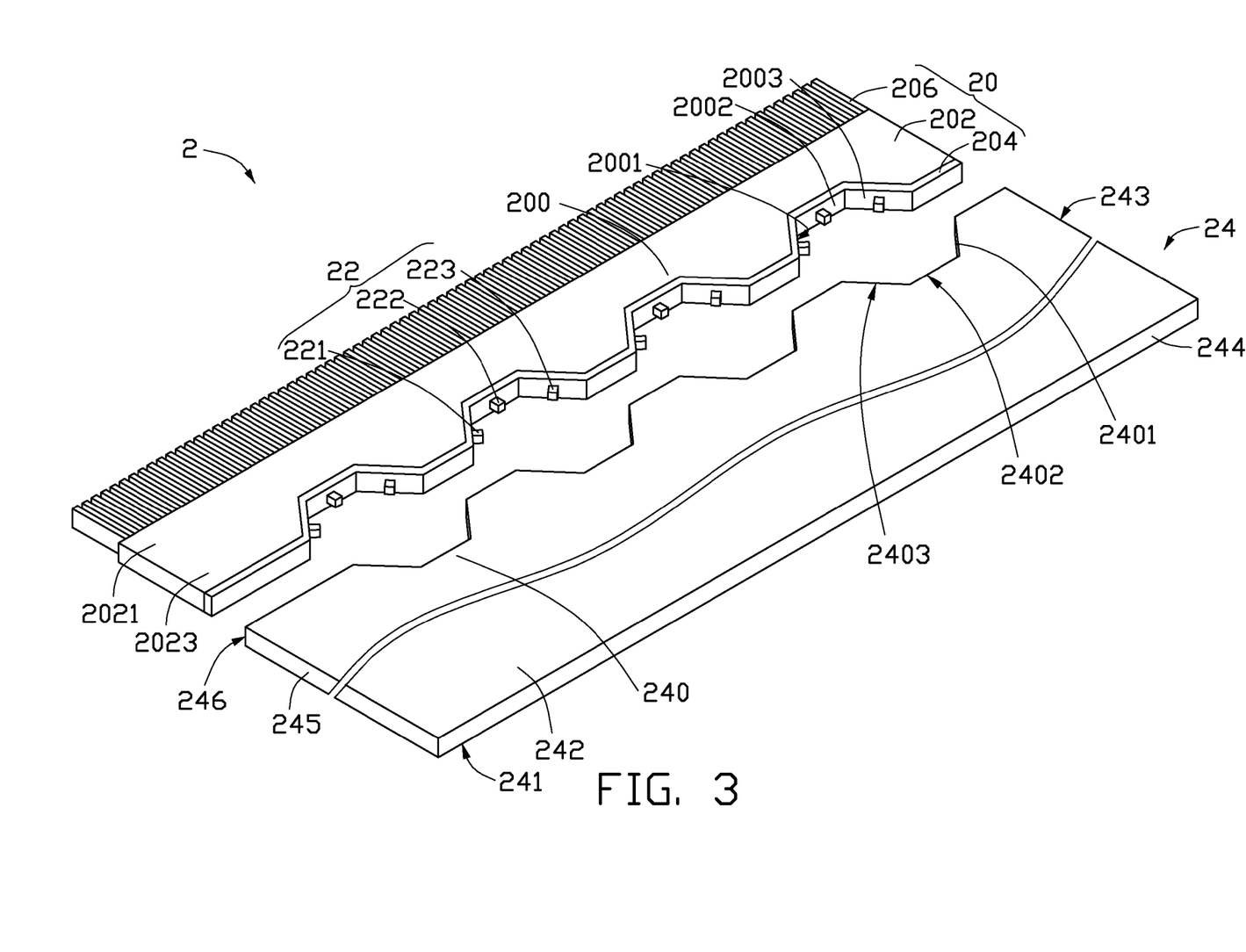
FIG. 3 is a schematic view of a second embodiment of a light source module.

FIG. 3 illustrates a light source module 2 in accordance with a second embodiment. The light source module 2 includes a base assembly 20, a plurality of LEDs 22, and an LGP 24.

The base assembly 20 is similar to the base assembly 10 of the first embodiment, differing only in that a plurality of light source orienting structures 200 are provided. In detail, the base assembly 20 includes a heat dissipation plate 202 having a first side 2021 and a second side 2023 at opposite long sides thereof, a plurality of heat dissipation fins 206 mounted on the first side 2021, and an FPCB 204 fixed on the second side 2023. It is understood that electrically connecting circuits and a driving chip of the FPCB 204 are not shown in FIG. 3. Four light source orienting structures 200, each of which has a structure similar to that of the light source orienting structure 100 of the first embodiment, are defined at the second side 2023. Each light source orienting structure 200 has a first mounting surface 2001, a second mounting surface 2002, and a third mounting surface 2003. The first, second, and third mounting surfaces 2001, 2002, 2003 have similar arrangements to those of the first, second, and third mounting surfaces 1001, 1002, 1003 of the first embodiment.

In the illustrated embodiment, the light source module 2 includes four first LEDs 221, four second LEDs 222, and four third LEDs 223 all mounted on the FPCB 204. The first LEDs 221 are substantially positioned at the first mounting surfaces 2001, respectively. The second LEDs 222 are substantially positioned at the second mounting surfaces 2002, respectively. The third LEDs 223 are substantially positioned at the third mounting surfaces 2003, respectively. More particularly, each group of one first LED 221, one second LED 222 and one third LED 223 is fully received within the recess of a corresponding light source orienting structure 200.

The LGP 24 is similar to the LGP 14 of the first embodiment, differing only in that a plurality of light guide structures 240 are provided. In detail, the LGP 24 includes a bottom face 241 and a top face 242 at opposite sides thereof, a first side face 243, a second side face 244, a third side face 245, and a fourth side face 246. The first, second, and third side faces 243, 244, 245 serve as light output surfaces, and the fourth side face 246 serves as a light input surface. Four light guide structures 240, each generally opposite and corresponding to one light source orienting structure 200, are defined at the fourth side face 246. Each light guide structure 240 has a structure similar to that of the light guide structure 140 of the first embodiment. Thus, the LGP 24 has four first light incident surfaces 2401, four second light incident surfaces 2402, and four third light incident surfaces 2403. Each of the first light incident surfaces 2401 is substantially parallel to a corresponding first mounting surface 2001, facing a corresponding first LED 221, and corresponds to the first side face 243. Each of the second light incident surfaces 2402 is substantially parallel to a corresponding second mounting surface 2002, facing a corresponding second LED 222, and corresponds to the second side face 244. Each of the third light incident surfaces 2403 is substantially parallel to a corresponding third mounting surface 2003, facing a corresponding third LED 223, and corresponds to the third side face 245.

Therefore, many or even most light beams from the four first LEDs 221 can propagate substantially perpendicularly into the four first light incident surfaces 2401, respectively, and exit from the first side face 243. Many or even most light beams from the four second LEDs 222 can propagate substantially perpendicularly into the four second light incident surfaces 2402, respectively, and exit from the second side face 244. Many or even most light beams from the four third LEDs 223 can propagate substantially perpendicularly into the four third light incident surfaces 2403, respectively, and exit from the third side face 245. Thus, the light source module 2 can provide various illumination effects, similar to those described above in relation to the light source module 1.

Figure 4:
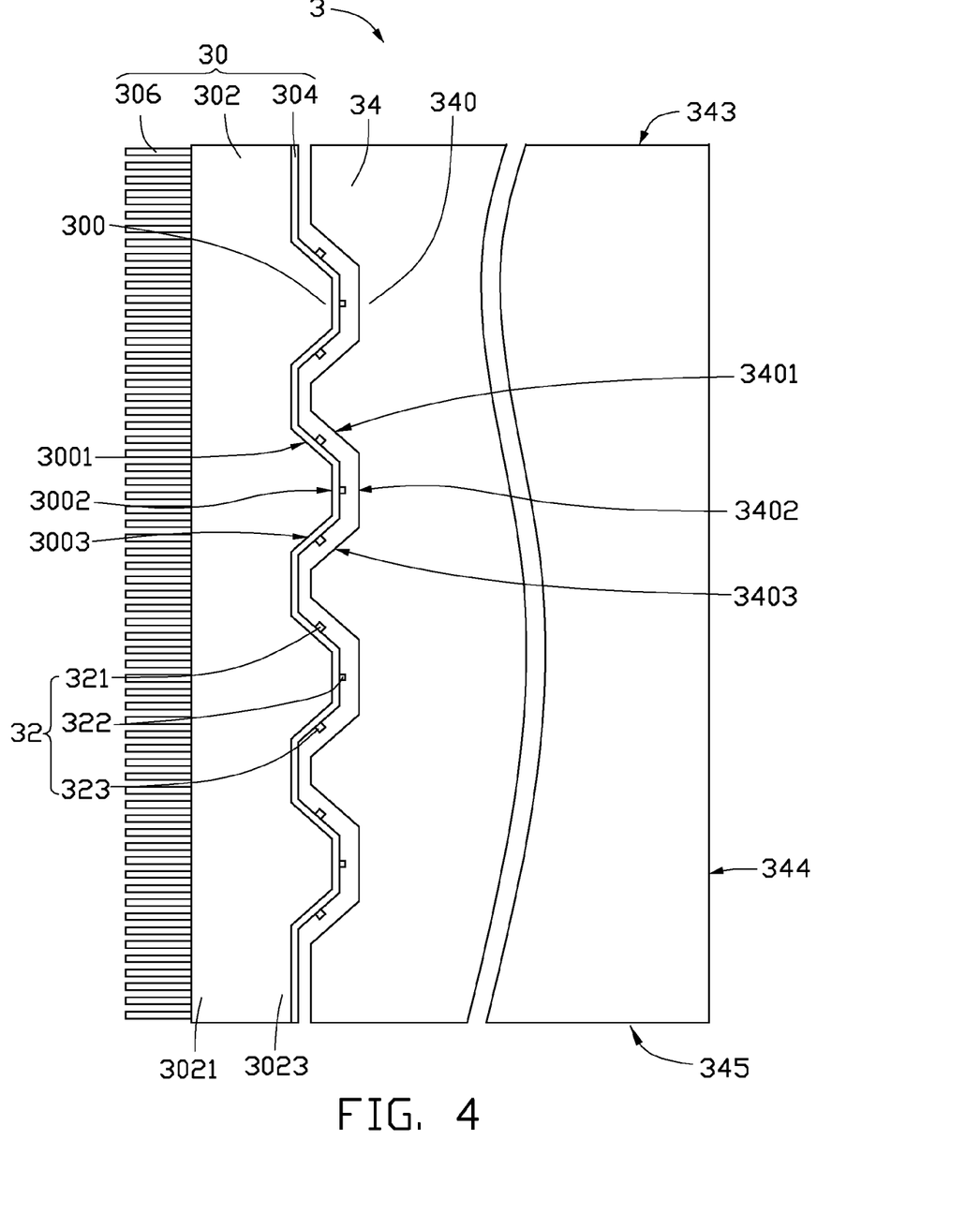
FIG. 4 is a top plan view of a third embodiment of a light source module.

Referring to FIG. 4, a third embodiment of a light source module 3 includes a base assembly 30, a plurality of LEDs 32 and an LGP 34. The LGP 34 has a structure similar to that of the LGP 24 of the second embodiment.

The base assembly 30 is similar to the base assembly 20 of the second embodiment, differing only in the form of a plurality of light source orienting structures 300 provided. The base assembly 30 includes a heat dissipation plate 302 having a first side 3021 and an opposite second side 3023, a plurality of heat dissipation fins 306 mounted on the first side 3021, and an FPCB 304 snugly fixed on the second side 3023. Four light source orienting structures 300 are defined at the second side 3023 of the heat dissipation plate 302. Each light source orienting structure 300 corresponds to one light guide structure 340 of the LGP 34, and is in the form of a trapezoidal-shaped protrusion. Thereby, the light source orienting structures 300 each have a first mounting surface 3001, a second mounting surface 3002, and a third mounting surface 3003. The first mounting surface 3001 faces a first light incident surface 3401 of a corresponding light guide structure 340. The second mounting surface 3002 interconnects the first and third mounting surfaces 3001, 3003, and faces a second light incident surface 3402 of the corresponding light guide structure 340. The third mounting surface 3003 faces a third light incident surface 3403 of the corresponding light guide structure 340. In the illustrated embodiment, the recess of each light source orienting structure 300 receives a part of the corresponding light guide structure 340 therein.

The light source module 3 includes four first LEDs 321, four second LEDs 322, and four third LEDs 323 all mounted on the FPCB 304. Each first LED 321 is substantially positioned at the corresponding first mounting surface 3001, faces a corresponding first light incident surface 3401, and corresponds to a first side face 343 of the LGP 34. Each second LED 322 is substantially positioned at the corresponding second mounting surface 3002, faces a corresponding second light incident surface 3402, and corresponds to a second side face 344 of the LGP 34. Each third LED 323 is substantially positioned at the corresponding third mounting surface 3003, faces a corresponding third light incident surface 3403, and corresponds to a third side face 345 of the LGP 34. In the illustrated embodiment, each group of one first LED 321, one second LED 322 and one third LED 323 is fully received within the recess of the corresponding light guide structure 340.

Therefore, many or even most light beams from the four first LEDs 321 can propagate substantially perpendicularly into the four first light incident surfaces 3401, respectively, and exit from the first side face 343. Many or even most light beams from the four second LEDs 322 can propagate substantially perpendicularly into the four second light incident surfaces 3402, respectively, and exit from the second side face 344. Many or even most of the light beams from the four third LEDs 323 can propagate substantially perpendicularly into the four third light incident surfaces 3403, respectively, and exit from the third side face 345.

Figure 5:
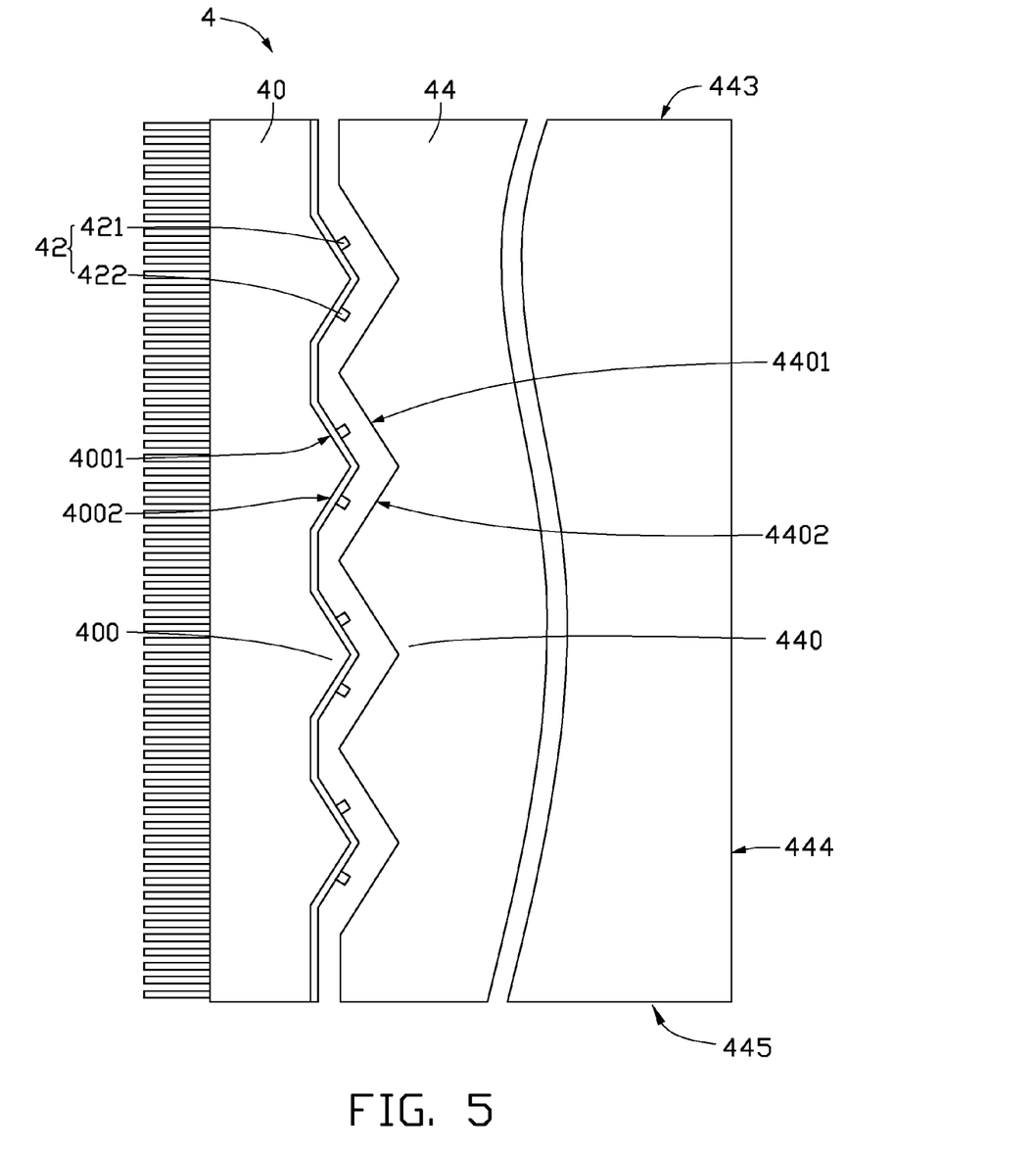
FIG. 5 is a top plan view of a fourth embodiment of a light source module.

FIG. 5 illustrates a light source module 4 in accordance with a fourth embodiment. The light source module 4 includes a base assembly 40, a plurality of LEDs 42, and an LGP 44.

The base assembly 40 is similar to the base assembly 30 of the third embodiment, differing only in the shape of a plurality of light source orienting structures 400 provided. In the illustrated embodiment, the base assembly 40 has four light source orienting structures 400, with each of the light source orienting structures 400 being in the form of a triangular-shaped protrusion. Thereby, each light source orienting structure 400 has a first mounting surface 4001 and an adjoining second mounting surface 4002. The adjoining first and second mounting surfaces 4001, 4002 intersect each other at an angle of about 120°.

The LEDs 42 include four first LEDs 421 and four second LEDs 422. Each first LED 421 is positioned at one of the first mounting surfaces 4001. Each second LED 422 is positioned at one of the second mounting surfaces 4002.

Correspondingly, the LGP 44 is similar to the LGP 34 of the third embodiment, differing only in the shape of a plurality of light guide structures 440 provided. In the illustrated embodiment, the LGP 44 has four light guide structures 440. Each of the light guide structures 440 is a recessed portion of the same one side (not labeled) of the LGP 44. Each light guide structure 440 defines a triangular-shaped recess. Thus, the LGP 44 has four first light incident surfaces 4401 and four second light incident surfaces 4402. Each first light incident surface 4401 faces toward a corresponding first mounting surface 4001, and substantially corresponds to a first side face 443 of the LGP 44. Each second light incident surface 4402 adjoins the corresponding first light incident surface 4401, faces toward a corresponding second mounting surface 4002, and substantially corresponds to a third side face 445 of the LGP 44. In the illustrated embodiment, the recess of each light guide structure 440 receives a part of the corresponding light source orienting structure 400 therein. In addition, each group of one first LED 421 and one second LED 422 is at least partially if not fully received within the recess of the corresponding light guide structure 440.

Thus, many or even most light beams from the first LEDs 421 can propagate substantially perpendicularly into the first light incident surfaces 4401, and exit from the first side face 443 of the LGP 44. Many or even most light beams from the second LEDs 422 can propagate substantially perpendicularly into the second light incident surfaces 4402 and exit from the third side face 445. When the light source module 4 operates, the first side face 443 is illuminated by the first LEDs 421, and the third side face 445 is illuminated by the second LEDs 422. A second side face 444 of the LGP 44 is illuminated by at least some of the first LEDs 421 and at least some of the second LEDs 422. Typically, the second side face 444 is illuminated less brightly than each of the first side face 443 and the third side face 445.

Figure 6:
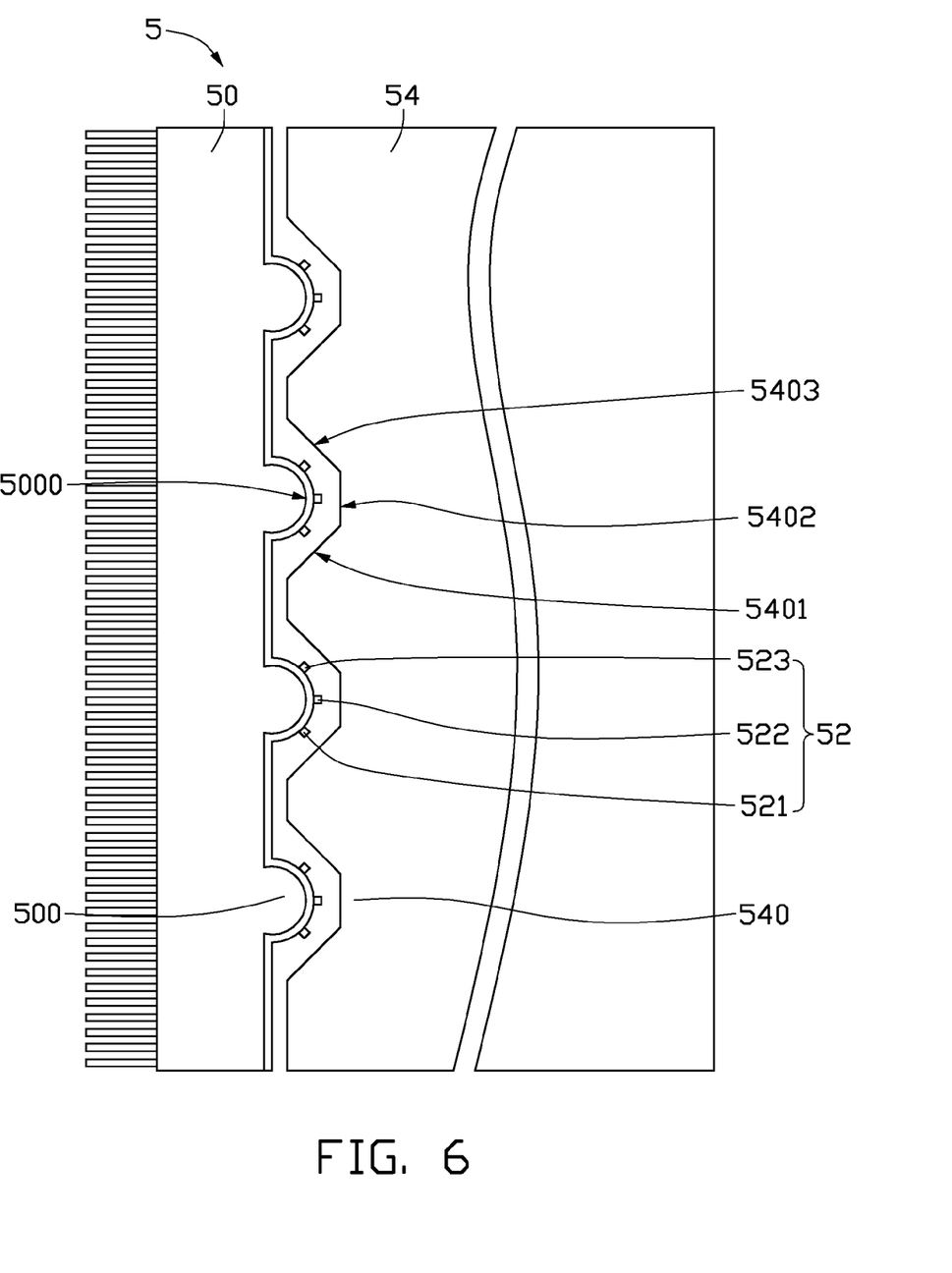
FIG. 6 is a top plan view of a fifth embodiment of a light source module.

Referring to FIG. 6, a light source module 5 in accordance with a fifth embodiment includes a base assembly 50, a plurality of LEDs 52, and an LGP 54. The LGP 54 has a structure similar to that of the LGP 34 of the light source module 3 of the third embodiment. The base assembly 50 has a structure similar to that of the base assembly 30 of the light source module 3, differing only in the shape of a plurality of light source orienting structures 500 provided. In the illustrated embodiment, each light source orienting structure 500 is in the form of a semicircular-shaped protrusion, and correspondingly has a semicircular-shaped mounting surface 5000.

The LEDs 52 include four first LEDs 521, four second LEDs 522, and four third LEDs 523. Each mounting surface 5000 has one first LED 521, one second LED 522, and one third LED 523 positioned thereat. The first LED 521 faces a corresponding first light incident surface 5401 of the LGP 54, the second LED 522 faces a corresponding second light incident surface 5402 of the LGP 54, and the third LED 523 faces a corresponding third light incident surface 5403 of the LGP 54. In the illustrated embodiment, the recess of each of the four light guide structures 540 receives a part of the corresponding light source orienting structure 500 therein. In addition, each group of one first LED 521, one second LED 522 and one third LED 523 is fully received within the recess of the corresponding light guide structure 540.

It is understood that the light source orienting structure 500 also can be a semicircular-shaped recessed portion, another kind of curve-shaped recessed portion, or another kind of curve-shaped protrusion. In other words, the mounting surface 5000 can have various other curved shapes.

Figure 7:
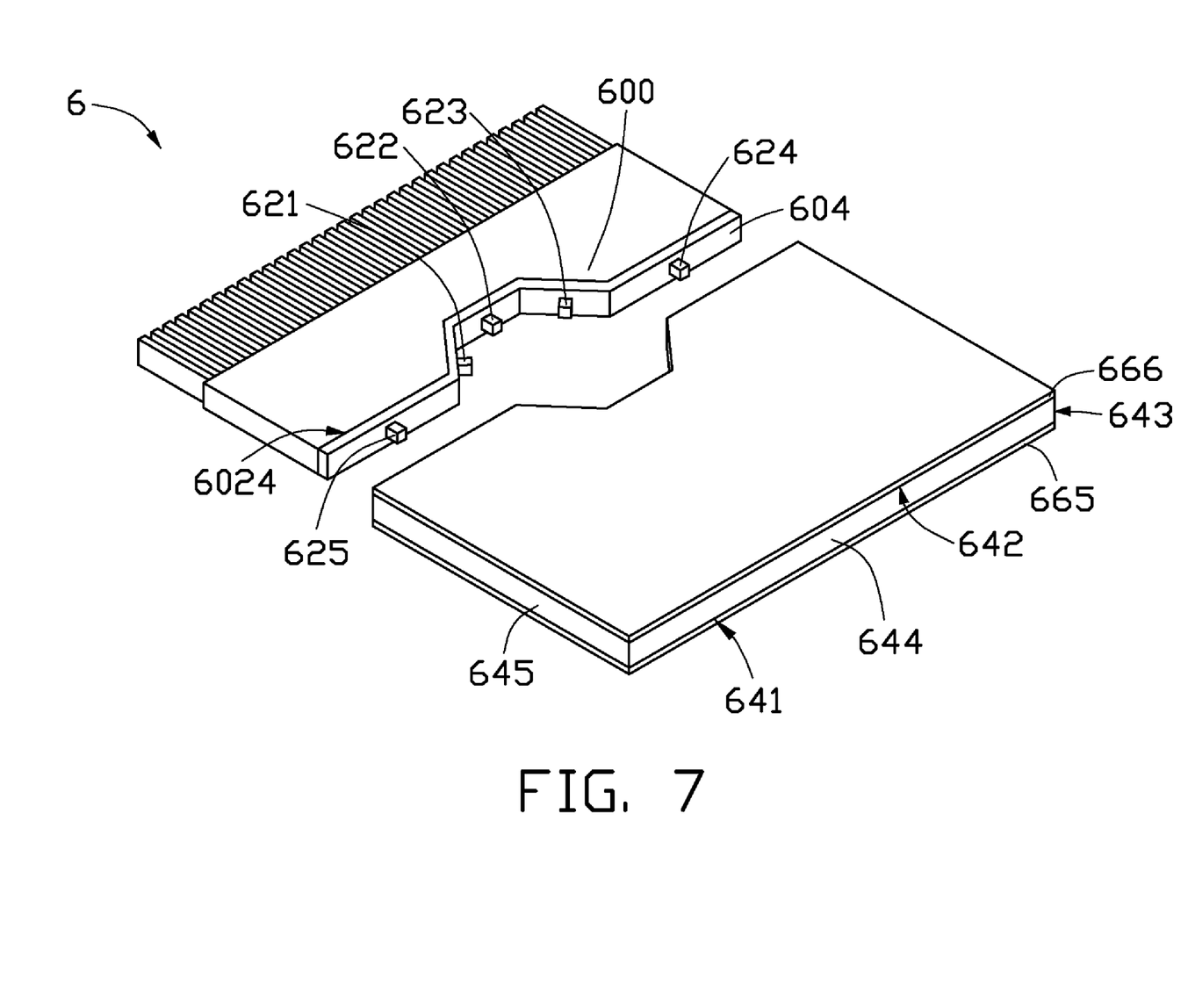
FIG. 7 is an isometric view of a sixth embodiment of a light source module.

Referring to FIG. 7, a sixth embodiment of a light source module 6 is similar to the light source module 1 of the first embodiment, differing only in that the light source module 6 further includes a fourth LED 624, a fifth LED 625, a first light-filter layer 665, and a second light-filter layer 666. The fourth and fifth LEDs 624, 625 are mounted on the FPCB 604 at two opposite sides of a light source orienting structure 600, respectively. That is, the fourth and fifth LEDs 624, 625 are positioned at two sections of a second side surface 6024, respectively. The first and second light-filter layers 665, 666 are intimately attached on bottom and top faces 641, 642 of an LGP 64, respectively. In one embodiment, the first and second light-filter layers 665, 666 are capable of transmitting light in different ranges of the visible spectrum.

When the light source module 6 operates, a first side face 643 of the LGP 64 is illuminated by many or even most of the light beams from the first LED 621. A second side face 644 of the LGP 64 is illuminated by many or even most of the light beams from the second, fourth, and fifth LEDs 622, 624, 625. A third side face 645 of the LGP 64 is illuminated by many or even most of the light beams from the third LED 623. The bottom face 641 is illuminated by part of the light beams from the LEDs 621, 622, 623, 624, and 625, and these light beams are colored by the first light-filter layer 665 before exiting the light source module 6. The top face 642 is illuminated by part of the light beams from the LEDs 621, 622, 623, 624, and 625, and these light beams are colored by the second light-filter layer 666 before exiting the light source module 6.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

The invention claimed is:

1. A light source module, comprising:
    a plurality of light emitting diodes;
    a base comprising a side face, wherein the plurality of light emitting diodes are mounted at the side face; and
    a light guide plate comprising at least three side faces, one of which is opposite to the plurality of light emitting diodes and defines a light input surface, and the others of which define light output surfaces;
    wherein the light input surface has at least one recess defined thereat thereby defining a plurality of light incident surfaces respectively corresponding to the light output surfaces, and the light emitting diodes face the light incident surfaces, respectively, such that a majority of light beams from each light emitting diode are capable of substantially perpendicularly propagating into the corresponding light incident surface and exiting from a corresponding one of the light output surfaces.

2. The light source module of claim 1, wherein the base comprises a heat dissipation plate and a flexible printed circuit board, the heat dissipation plate comprises a first side and an opposite second side, the second side is generally adjacent to the light guide plate, the side face is defined at the second side and has the flexible printed circuit board fixed thereon, the light emitting diodes are mounted on the flexible printed circuit board, and the flexible printed circuit board is capable of switching each light emitting diode on and off.

3. The light source module of claim 2, wherein the first side of the heat dissipation plate defines another side face, the base further comprises a plurality of heat dissipation fins fixed on the side face of the first side along a length of that side face, and the heat dissipation fins are parallel to each other.

4. The light source module of claim 2, wherein the flexible printed circuit board comprises a substrate layer, a plurality of electrically connecting circuits, and a driving chip, one end of each electrically connecting circuit is connected with a respective light emitting diode, another end of each electrically connecting circuit is connected with the driving chip, and the driving chip is capable of controlling the connectivity of each of the electrically connecting circuits.

5. The light source module of claim 2, wherein at least one recess or at least one protrusion is defined at the side face of the heat dissipation plate, corresponding to the at least one recess at the light input surface of the light guide plate, and the light emitting diodes are substantially positioned at the at least one recess or at least one protrusion defined at the side face of the heat dissipation plate.

6. The light source module of claim 5, wherein the at least one recess or at least one protrusion defined at the side face of the heat dissipation plate defines a plurality of light mounting surfaces respectively corresponding to the light incident surfaces, the number of the light emitting diodes is equal to the number of the light mounting surfaces, each light emitting diode is substantially positioned at a corresponding one of the mounting surfaces, and each light emitting diode has a light emitting surface substantially parallel to the corresponding mounting surface.

7. The light source module of claim 5, wherein the at least one recess or at least one protrusion defined at the side face of the heat dissipation plate defines at least one curved mounting surface, the light emitting diodes are substantially positioned at the at least one curved mounting surface, and each light emitting diode has a light emitting surface substantially parallel to the corresponding light incident surface.

8. The light source module of claim 1, further comprising a second plurality of light emitting diodes, wherein the base defines at least one recess or at least one protrusion at the side face of the heat dissipation plate, at least two of said second plurality of light emitting diodes are substantially positioned at two opposite sides of the at least one recess or at least one protrusion at the side face, respectively, said plurality of light emitting diodes are substantially positioned at the at least one recess or at least one protrusion at the side face, each of the light output surfaces has one of said plurality of light emitting diodes optically coupled thereto, respectively, and one of such light output surfaces further has said second plurality of light emitting diodes optically coupled thereto.

9. The light source module of claim 1, further comprising a first light-filter layer and a second light-filter layer capable of transmitting light in different ranges of the visible spectrum, the light guide plate further comprising a bottom face and a top face, wherein the at least three side faces are between the bottom face and the top face, the first light-filter layer is attached on the bottom face of the light guide plate, and the second light-filter layer is attached on the top face of the light guide plate.

10. A light source module, comprising:
a light guide plate comprising a first side face, a second side face, and a third side face, the first and second side faces being at opposite sides of the light guide plate, the third side face being between the first and second side faces, a recessed portion being defined at the third side face, the recessed portion defining a first light incident surface substantially corresponding to the first side face and a second light incident surface substantially corresponding to the second side face;
a base comprising a side facing toward the third side face; and
a first light emitting diode and a second light emitting diode mounted at the side of the base in such a manner that the first light emitting diode faces the first light incident surface and the second light emitting diode faces the second light incident surface, with most of the light beams from the first light emitting diode capable of substantially perpendicularly propagating into the first incident surface and emitting from the first side face, and most of the light beams from the second light emitting diode capable of substantially perpendicularly propagating into the second incident surface and emitting from the second side face.

11. The light source module of claim 10, wherein a recessed portion or a protrusion is defined at the side of the base, the recessed portion or protrusion defined at the side of the base comprises a first mounting surface and a second mounting surface, the first mounting surface faces toward the first light incident surface, the second mounting surface faces toward the second light incident surface, the base further comprises a flexible printed circuit board snugly attached on the first and second mounting surfaces, the first and second light emitting diodes are mounted on the flexible printed circuit board in such a manner that the first light emitting diode is substantially positioned at the first mounting surface, and the second light emitting diode is substantially positioned at the second mounting surface, and the flexible printed circuit board is capable of switching each light emitting diode on and off.

12. The light source module of claim 11, wherein the first mounting surface is substantially parallel to the first light incident surface, the second mounting surface is substantially parallel to the second light incident surface, the first light emitting diode comprises a first light emitting surface substantially parallel to the first light incident surface, and the second light emitting diode comprises a second light emitting surface substantially parallel to the second light incident surface.

13. The light source module of claim 11, further comprising a third light emitting diode, wherein the light guide plate further comprises a third light incident surface defined at the recessed portion or protrusion thereof and a fourth side face substantially corresponding to the third light incident surface, the third light incident surface is between the first and second light incident surfaces, the fourth side face is at an opposite side of the light guide plate from the third side face between the first and second side faces, the recessed portion or protrusion defined at the side of the base further comprises a third mounting surface, the third mounting surface is between the first and second mounting surfaces and corresponds to the third light incident surface, the third light emitting diode is mounted on the flexible printed circuit board in such a manner that the third light emitting diode is substantially positioned at the third mounting surface and faces the third light incident surface, and most of the light beams from the third light emitting diode are capable of substantially perpendicularly propagating into the third light incident surface and emitting from the fourth side face.

14. The light source module of claim 10, wherein the first light emitting diode comprises a first light emitting surface, the second light emitting diode comprises a second light emitting surface, a recessed portion or a protrusion is defined at the side of the base, the recessed portion or protrusion defined at the side of the base comprises a curved mounting surface substantially facing toward the recessed portion or protrusion defined at the third side face of the light guide plate, the base further comprises a flexible printed circuit board snugly attached on the curved mounting surface, the first and second light emitting diodes are mounted on the flexible printed circuit board in such a manner that the first light emitting surface of the first light emitting diode is substantially parallel to the first light incident surface, and the second light emitting surface of the second light emitting diode is substantially parallel to the second light incident surface, and the flexible printed circuit board is capable of switching each light emitting diode on and off.

15. A light source module, comprising:
a flexible substrate comprising a driving chip and a plurality of electrically connecting circuits each electrically connected with the driving chip;
a plurality of light emitting diodes each having a light emitting surface, the light emitting diodes being mounted on the flexible substrate such that the light emitting surfaces of the light emitting diodes face in different directions, the light emitting diodes coupled to the electrically connecting circuits such that the driving chip is capable of switching each of the light emitting diodes on and off; and
a light guide plate comprising a light input surface opposite to the light emitting diodes and a plurality of light output surfaces optically coupled via the light input surface to the light emitting diodes, respectively, at least one light guide structure being defined at the light input surface so that a majority of light beams emitted from each light emitting diode pass substantially perpendicularly through a corresponding portion of the at least one light guide structure and exit from the corresponding light output surface.

16. The light source module of claim 15, wherein the light guide plate comprises a bottom face, a top face and a plurality of side faces between the bottom face and the top face, and the light input surface and the light output surfaces are comprised in the side faces.

17. The light source module of claim 16, further comprising a first light-filter layer attached on the bottom face of the light guide plate and a second light-filter layer attached on the top face of the light guide plate, wherein the first and second light-filter layers are capable of transmitting light in different ranges of the visible spectrum.

18. The light source module of claim 15, further comprising a heat dissipation plate, wherein at least one light source orienting structure is defined at a side of the heat dissipation plate, the at least one light source orienting structure is one of a recessed portion and a protrusion, the flexible substrate is snugly fixed on the at least one light source orienting, the at least one light source orienting structure corresponds to the at least one light guide structure defined at the light input surface of the light guide plate, at least two of the light emitting diodes are connected to the flexible substrate and substantially positioned at the at least one light source orienting structure, and the at least one light guide structure of the light guide plate is a recessed portion.

19. The light source module of claim 18, wherein a plurality of heat dissipation fins are provided at another side of the heat dissipation plate.

20. The light source module of claim 18, further comprising a second plurality of light emitting diodes, wherein at least two of said second plurality of light emitting diodes are connected to the flexible substrate and substantially positioned at two opposite sides of the at least one light source orienting structure, each light output surface has at least one of said plurality of light emitting diodes optically coupled thereto, and one of such light output surfaces further has said second plurality of light emitting diodes optically coupled thereto.

* * * * *